US006564148B2

(12) United States Patent
Morgan et al.

(10) Patent No.: US 6,564,148 B2
(45) Date of Patent: May 13, 2003

(54) INTEGRATED INERTIAL VMS NAVIGATION WITH INERTIAL ODOMETER CORRECTION

(75) Inventors: Kenneth S. Morgan, St. Petersburg, FL (US); Michael O. Vaujin, Safety Harbor, FL (US)

(73) Assignee: Honeywell International, Morristown, NJ (US)

( * ) Notice: Subject to any disclaimer, the term of this patent is extended or adjusted under 35 U.S.C. 154(b) by 0 days.

(21) Appl. No.: 09/828,023

(22) Filed: Apr. 6, 2001

(65) Prior Publication Data

US 2002/0156579 A1 Oct. 24, 2002

Related U.S. Application Data

(60) Provisional application No. 60/273,771, filed on Mar. 6, 2001.

(51) Int. Cl.$^7$ .............................................. G01C 21/00
(52) U.S. Cl. .................................................... 701/220
(58) Field of Search ........................ 701/10, 200, 214, 701/207, 216–217, 220–221, 224–225, 300; 342/104, 106–107, 118, 139–140, 357.01–357.04, 357.07–357.08, 357.11, 357.14, 457; 340/429, 540, 545.5, 669–672, 686.1, 689, 933, 935, 938–939, 974–975, 977–979; 73/1.37–1.39, 1.75–1.79, 765, 767, 503.3, 504.03

(56) References Cited

U.S. PATENT DOCUMENTS

| 4,507,737 A | * | 3/1985 | LaSarge et al. ............. 701/220 |
| 5,075,693 A | * | 12/1991 | McMillan et al. .......... 342/457 |
| 6,085,149 A | | 7/2000 | Morgan et al. |

FOREIGN PATENT DOCUMENTS

| JP | 09-243385 | * | 9/1997 | ........... G01C/21/00 |
| JP | 09-243386 | * | 9/1997 | ........... G01C/21/00 |

* cited by examiner

Primary Examiner—Thu Nguyen

(57) ABSTRACT

A system for determining accurate inertial navigation data of a vehicle while moving must compensate for the orientation differences between an upper body and a lower body of the vehicle. These orientation differences are used to increase the accuracy of the aided inertial navigation solution. An odometer on the lower body is used to reduced errors in the inertial data arising from movement between the upper and lower bodies and errors in the odometer associated with vehicle pitch are reduced by sensing pitch changes with the inertial navigation data.

18 Claims, 15 Drawing Sheets

Kalman Gain Equation, $K = P*Transpose(H)*Inverse(H*P*Transpose(H) = R)$

Weight Vector

INTEGRATED INERTIAL VMS NAVIGATION WITH INERTIAL ODOMETER CORRECTION

This application claims the benefit of provisional application Ser. No. 60/273,771, filed Mar. 6, 2001

BACKGROUND

This invention relates to the use of inertial navigation systems (INS) on vehicle such as trucks and tanks, in particular integrating INS with a mechanical odometer of Vehicle Motion Sensor (VMS) on the vehicle.

Current Inertial Navigation Systems (INS) models for odometer aiding assume the vehicle suspension is a rigid body. Odometer aided inertial systems create an integrated navigation solution. Because the inertial system is mounted on the vehicle body measuring the vehicle motion while the odometer measures motion of the chassis, the odometer aided inertial system attempts to estimate the orientation between the vehicle body and the vehicle chassis to correct for errors in the odometer. This inertial/odometer error model works well when the vehicle suspension system is rigid. A vehicle suspension system is rigid when there is a constant orientation between the vehicle body and vehicle chassis. An inertial/odometer error model "works well" when the integrated solution can estimate the relative orientation of the vehicle body to the vehicle chassis with a 0.08 degree or better accuracy. The assumption of constant relative orientation does not work well when the vehicle body moves significantly relative to the vehicle chassis. In some vehicles, this motion can be as much as two degrees. Significant errors in the odometer calibration occur when changes in this orientation are not modeled correctly. These errors in odometer calibration degrade the primary system outputs. Both vertical velocity and vertical position (altitude) are degraded because of the odometer modeling errors.

Additional error sources occur when the odometer is connected to a vehicle with tires that can deform as a function of vehicle loading. This deformation can occur when the vehicle is traveling up or down a hill, resulting in significant changes in odometer scale factor, on the order of one to two percent. These scale factor changes can result in poor position performance when the vehicle is traveling in a hilly terrain.

Present state of the art for odometer aided inertial systems models a vehicle suspension system as a rigid body. Odometer aided inertial systems create an integrated navigation solution. The integrated navigation solution contains data such as vehicle position, vehicle velocity and vehicle attitude. In addition to these primary system outputs, the odometer aided inertial system calibrates the odometer with an odometer error model. Because the inertial system is mounted on the vehicle body and the odometer measures motion of the chassis, the odometer aided inertial system attempts to estimate the orientation between the vehicle body and the vehicle chassis. The body of this vehicle is defined as the upper part of this vehicle containing the engine, occupants, ammunition, etc. The vehicle body rests upon the vehicle chassis which is defined as the under part of this vehicle consisting of the frame with axles and the wheels or tracks.

This inertial/odometer error model works well when the integrated solution can estimate the relative orientation of the vehicle body to the vehicle chassis with a 0.08 degree or better accuracy. The assumption of constant relative orientation does not work well when the vehicle body moves significantly relative to the vehicle chassis. In some vehicles, this motion can be as much as two degrees. Significant errors in the odometer calibration occur when changes in this orientation are not modeled correctly. These errors in odometer calibration degrade the primary system outputs. Both vertical velocity and vertical position (altitude) are degraded because of the odometer modeling errors. In additional, such attitude variations produce errors in calibration as explained below.

SUMMARY OF THE INVENTION

According to the invention, inertial sensor data from an INS, corrected by the Kalman filter via navigation state corrections, is integrated to form inertial position, velocity, and attitude. Inertial position represents the position of the vehicle on the earth. Inertial velocity represents the velocity of the vehicle with respect to the earth. Inertial attitude data describes the orientation of the vehicle body with respect to the earth. Vehicle motion or speed is measured from the drive system, e.g. axle rotation, with an odometer. Vehicle pitch is sensed with the INS. The data from the two motion sensing devices on the vehicle, one attached to the chassis the other to the body, is combined with inertial velocity and attitude information to form integrals of data that are used for observation processing by the Kalman filter. These integrals, combined with inertial position, velocity, and attitude data, are used by a Kalman filter to form corrections to the odometer error states and corrections to the navigation error states.

The output of the system is the optimally corrected inertial navigation solution. The inertial navigation solution consists of position, velocity, and attitude information for the vehicle.

Benefits and features of the invention will be obvious to one of ordinary skill in the art from the following description of the invention.

DESCRIPTION

INS Correction for Pitch and Yaw

An Inertial Navigation System (INS) is a self-contained device that reports to the outside world information about the host vehicle's position on the surface of the Earth, velocity and attitude (roll, pitch and yaw). Land vehicles containing an INS may use this information for various purposes, such as for surveying or for pointing objects like a gun tube or a RADAR antenna. The output of an INS (position, velocity and attitude) contains characteristic errors that grow over time. In situations in where only a certain amount of error in the INS output is tolerable, the growth of the INS errors must be bounded by either providing input to the INS from an aiding device, or periodically bringing the vehicle to a complete stop. In situations where stopping the vehicle frequently is undesirable, an aiding device is the only option to control the growth of INS errors over time. When the INS is aided with additional information from aiding devices such as GPS, this additional information is input to the INS and used by the INS Kalman filter to decrease the system error. Many references exist which describe the design and operation of a Kalman filter, such as "Applied Optimal Estimation" written by the Technical Staff, The Analytic Sciences Corporation, edited by Arthur Gelb, 1974.

One such aiding device is a Global Positioning System (GPS) receiver, which uses signals from Earth orbiting satellites to aid the INS by sending the INS independent position and velocity information. However, the signals from the satellites can be blocked by structures and foliage or jammed by the enemy during wartime, and, therefore, are not necessarily continuously present. Another aiding device that provides an independent velocity reference on a land vehicle is called a Vehicle Motion Sensor (VMS). The VMS is a device that detects the rotation of the vehicle's drive shaft and sends an electrical pulse stream to the INS. Each pulse represents a fixed number of rotations of the vehicle's drive shaft. The INS software then multiplies the number of pulses input from the VMS by a scaling factor that converts the number of drive shaft revolutions to a distance traveled. This distance information is used by the Kalman filter to bound the growth of errors over time. The advantage of this sort of aiding information is that the information cannot be jammed or blocked.

Figure 1:
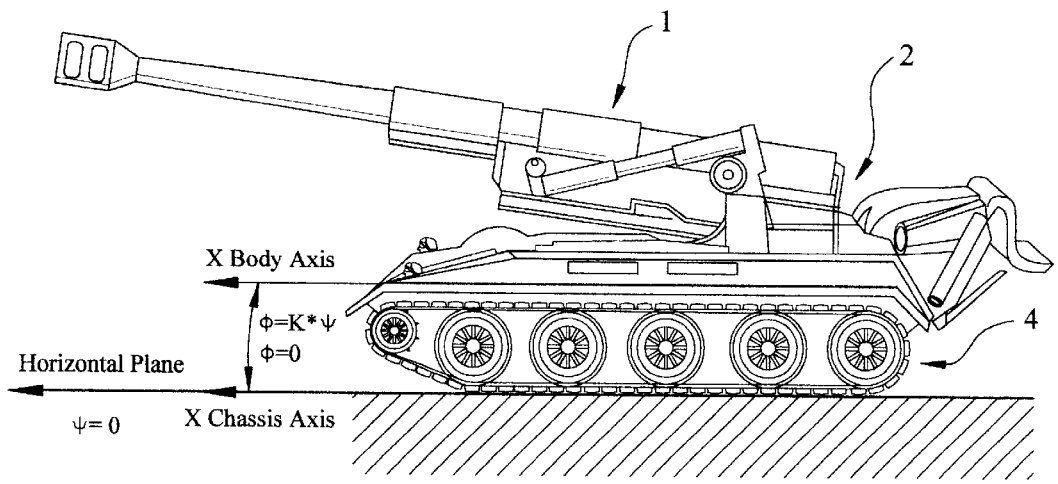
FIG. 1 shows a vehicle moving on a level terrain.
Figure 2:
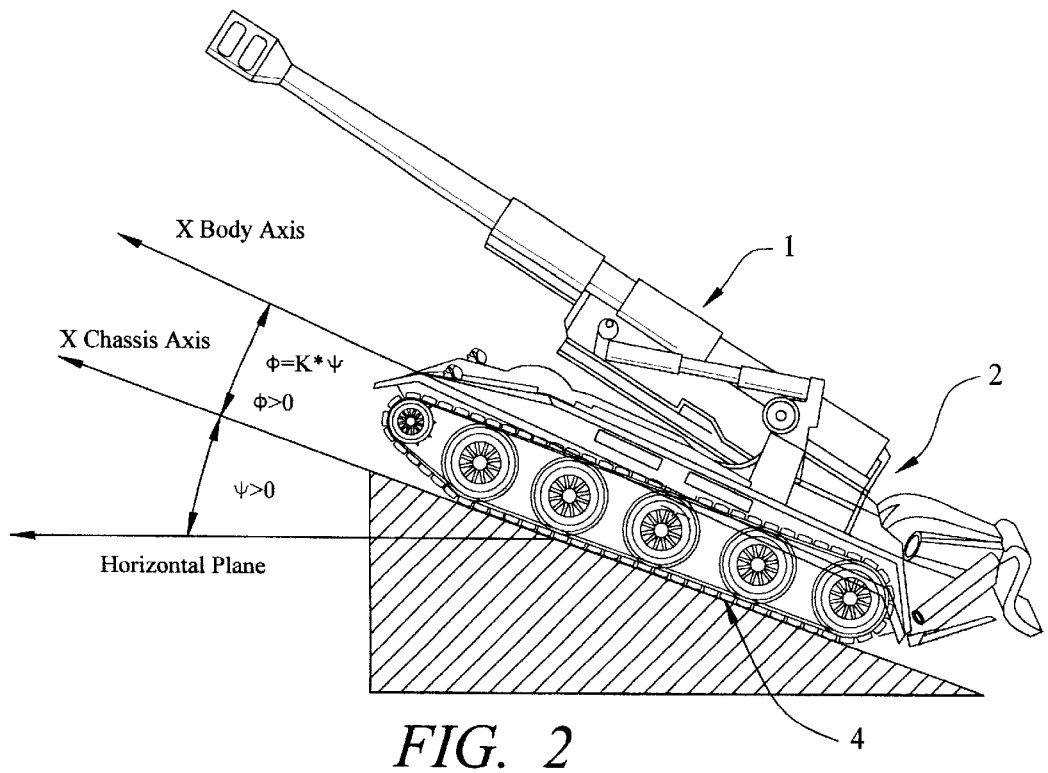
FIG. 2 shows a vehicle moving on an upward sloping terrain.
Figure 3:
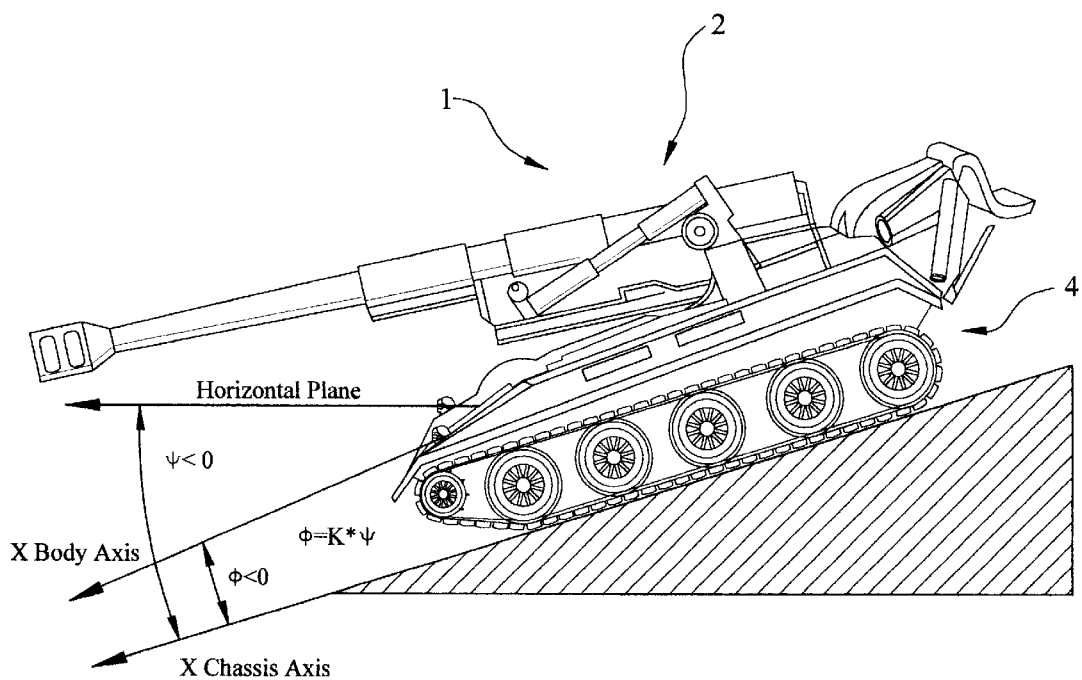
FIG. 3 shows a vehicle moving on a downward sloping terrain.

The present invention models the relationship between the vehicle body 2 and the vehicle chassis 4 is a function of vehicle pitch in FIGS. 1–3. This function of vehicle pitch has a zero order component and a first order component. Inertial systems are mounted on the body 2 of the vehicle 1 due to operational considerations. The sway (F) of a vehicle 1 is an angular reorientation of the vehicle body 2 to the vehicle chassis 4 and is directly proportional to vehicle pitch (y). The proportionality constant is K. Vehicle pitch is defined as the angular orientation between the X vehicle body axis and the horizontal plane. The Z vehicle body axis is down through the center of the vehicle 1. The Y vehicle body axis is perpendicular to the X and the Z axis and toward the right when facing along the positive X body axis. The X, Y and Z axes form a right handed orthogonal coordinate frame.

FIGS. 1–3 show a vehicle 1 traveling different terrain and the resulting vehicle body and vehicle chassis orientation. FIG. 1 shows a vehicle 1 on a level terrain, where pitch and yaw are zero. When the vehicle pitch is zero, the vehicle sway is zero and the angular orientation between the vehicle chassis 4 and the vehicle body 2 remains constant. FIG. 2 shows a vehicle 1 ascending a hill, for example. The vehicle pitch is positive and vehicle or body sway is positive as a result and the angular orientation between the vehicle chassis 4 and the vehicle body 2 changes to a new value that is proportional to the vehicle pitch because, due to the suspension, the vehicle body 2 is lower on the tracks or wheels in the rear and higher on the tracks or wheels in the front.

FIG. 3 shows the vehicle 1 descending the hill. The vehicle pitch now is negative and vehicle sway is also negative. As with the previous example, the angular orientation between the vehicle chassis 4 and the vehicle body 2 changes to a new value that is proportional to the vehicle pitch, but now the vehicle body 2 is higher on the tracks or wheels in the rear and lower on the tracks or wheels in front.

Figure 4:
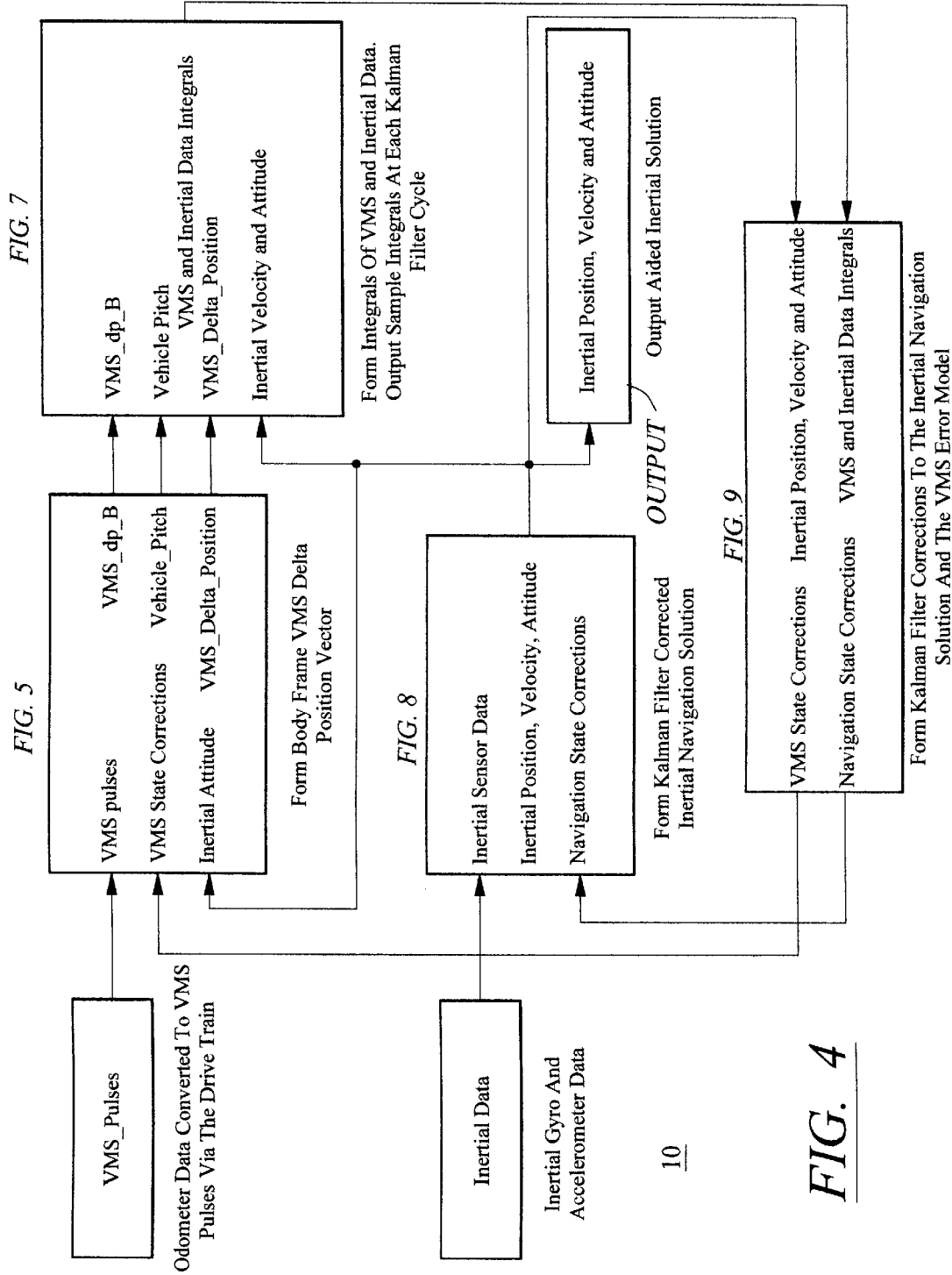
FIG. 4 shows the system of the present invention that determines increased accuracy inertial navigation data based on the sway.

FIG. 4 shows the general flow of data in an INS(inertial navigation system)/VMS (vehicle motion sensor, e.g. odometer) navigation system 10 embodying the present invention. The inputs to the system 10 are inertial data (gyro and accelerometer signals) on the body reference frame and VMS input pulses from the chassis frame of reference. Gyros and accelerometers (not shown) give measures of the inertial motion of the vehicle 1. Accelerometers detect linear acceleration and gyros are used to measure angular motion. VMS pulses are discrete pulses from a vehicle motion sensor, which is not shown but basically an odometer connected to the drive wheels or track to measure speed. A VMS typically involves an odometer cable with electronics to convert the rotation of the odometer cable into pulse counts. A VMS will output fixed number of pulses for a given rotation of the odometer cable. The output of the system 10 is the optimally corrected inertial navigation solution using the speed measured by the VMS to correct velocity errors in the INS resulting from the relative movement of the body on the chassis. The inertial navigation solution consists of position, velocity, and attitude information for the vehicle 1.

Figure 5:
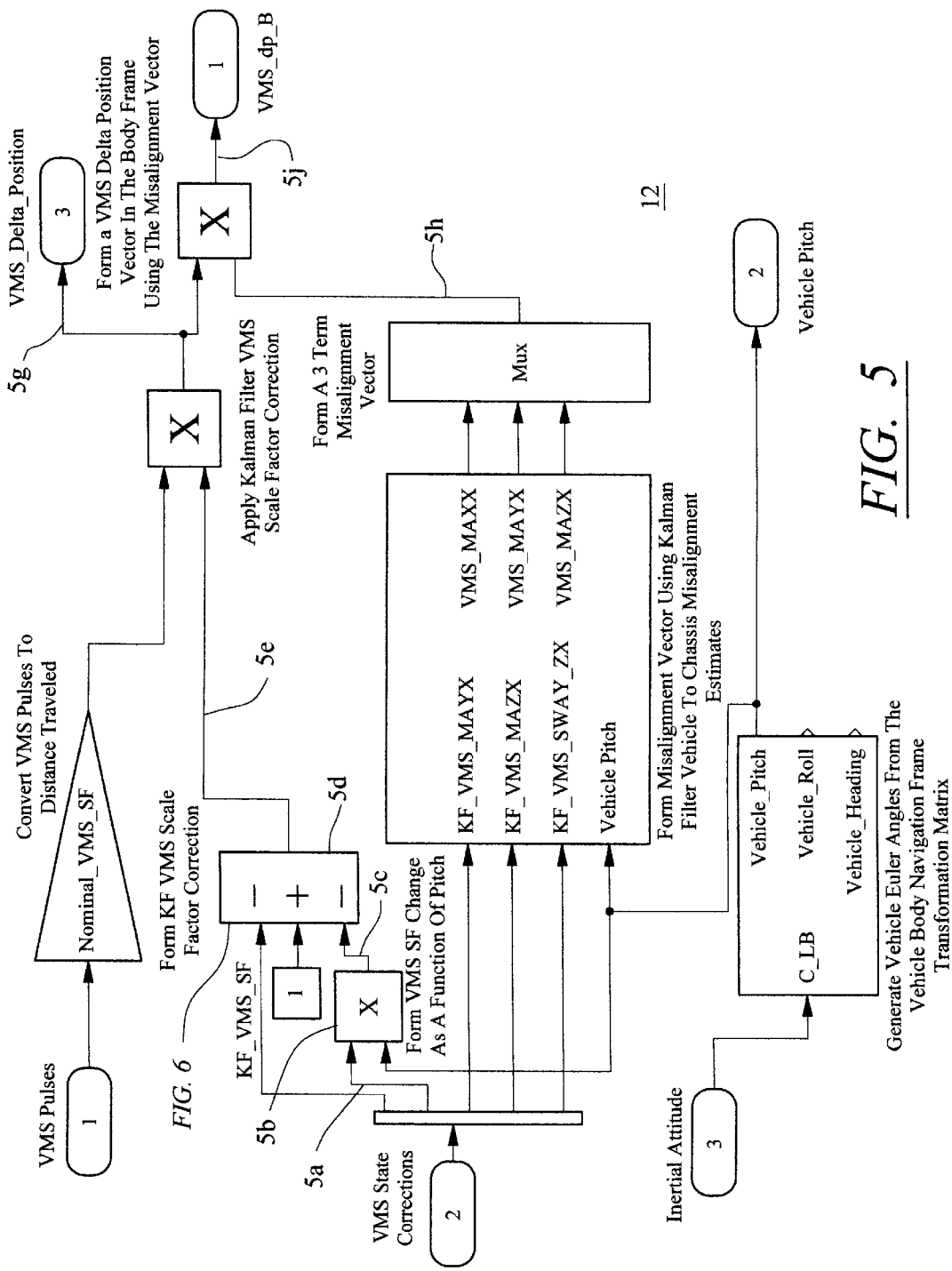
FIG. 5 shows the determination of the change in position of the vehicle in the body frame.

FIG. 5 shows a vehicle position change determining means 12 that uses the VMS, inertial, and Kalman filter data to form a vector representing vehicle position change in the vehicle body reference frame. The computations are performed at a higher rate than the computation rate of the Kalman filter. A typical rate for the Kalman filter would be one Hertz. The VMS delta position vector will be formed at a computation above 10 Hz and below 100 Hz. The VMS pulses are first converted to the distance traveled. The VMS pulses are multiplied by Nominal_VMS_SF (scale factor), a constant representing the nominal number of pulses for a distance traveled. For example, the scale factor could be 1 foot for every 5 pulses.

VMS State Corrections from a previous processing cycle are input as KF_VMS_SF or the Kalman Filter(KF) VMS Scale Factor. The VMS pulses are combined with KF_VMS_SF to form a KF VMS scale factor correction to correct the current measured VMS distance traveled over a period of time to form a VMS position change or VMS_Delta_Position. This VMS position change is in the vehicle chassis frame of reference. The VMS State Corrections are also input into a misalignment determination means or computation 14 in which the Kalman Filter misalignment inputs are input as KF_VMS_MAYX, KF_VMS_MAZX, KF_VMS_SWAY_ZX. The Vehicle Pitch is also input in order to determine the VMS misalignment estimates expressed as VMS_MAXX, VMS_MAYX, VMS_MAZX which are combined in a Mux to form one vector which is then combined with corrected VMS delta position to form the VMS delta position in the body frame with the misalignment vector. This output is VMS_dp_B which is the distance traveled in the vehicle body frame. The Vehicle_Pitch is formed from the Inertial Attitude which also generates Vehicle_Roll and Vehicle_Heading with some standard calculations known in this area of technology.

Figure 6:
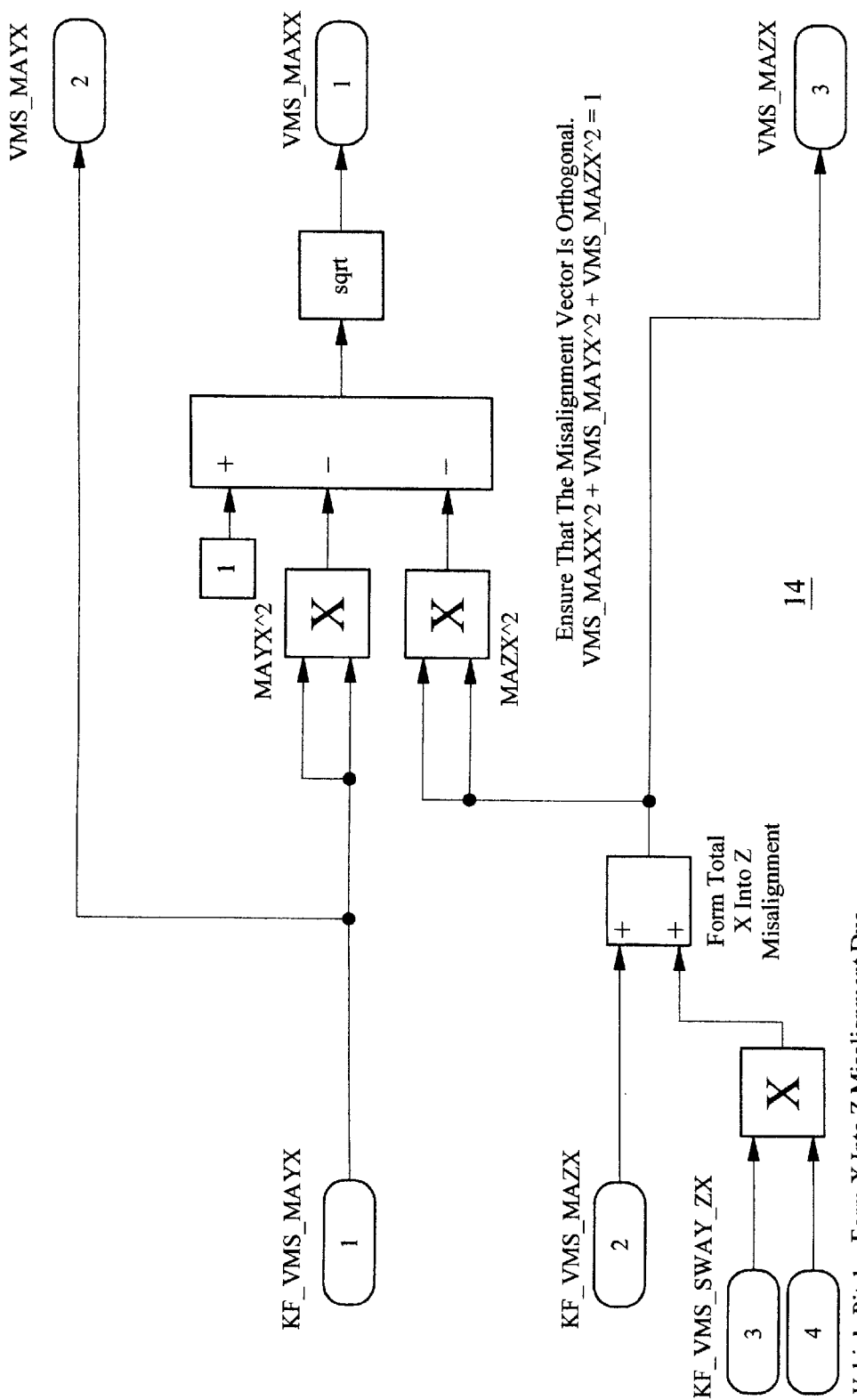
FIG. 6 shows a determination of misalignment between the body and the chassis in a vehicle.

FIG. 6 shows how Kalman filter estimates of the three VMS misalignment states are used to form a direction cosine vector used to transform VMS pulses from the vehicle chassis frame to the vehicle body frame. KF_VMS_MAYX is the misalignment between the chassis in the X axis and the body in the Y axis. KF_VMS_MAZX represents the misalignment between the chassis in the X axis and the body in the Z axis. These two misalignment factors will always exist as offsets since the chassis and body will never be perfectly aligned. VMS_MAYX is output without further processing since there is no significant misalignment change in the Y axis between the chassis 4 and the body 2 while the vehicle 1 is moving.

VMS_MAZX requires processing since sway between the body 2 and chassis 4 will occur while the vehicle 1 is moving. The pitch sway state symbol in FIG. 6, called KF_VMS_SWAY_ZX, is the same as the K in FIGS. 1, 2, and 3. This scale factor is a function of pitch and represents the misalignment changes that have occurred and is therefore combined with Vehicle_Pitch to result in a total misalignment. This total misalignment is combined with KF_VMS_MAZX to provide VMS_MAZX representing the new misalignment in the Z axis between the chassis 4 and body 2.

Using known calculations, MAZX and MAYX are used to determine VMS_MAXX. This is a direction cosine vector representing a new axis reference compensating for the misalignment between the chassis 4 and body 2. For example, assume the X, Y, Z axes are in the body frame. As stated before, the chassis 4 and body 2 have a misalignment. Therefore to compensate for the misalignment and allow the chassis frame data to be used in the body frame. The X axis of the chassis frame will be at an angle from the X axis of the body frame. The cosine of this angle compensates for this misalignment between the chassis 4 and the body 2 and provides a new axis for which chassis data can be used in the body axes frame of reference.

Figure 7:
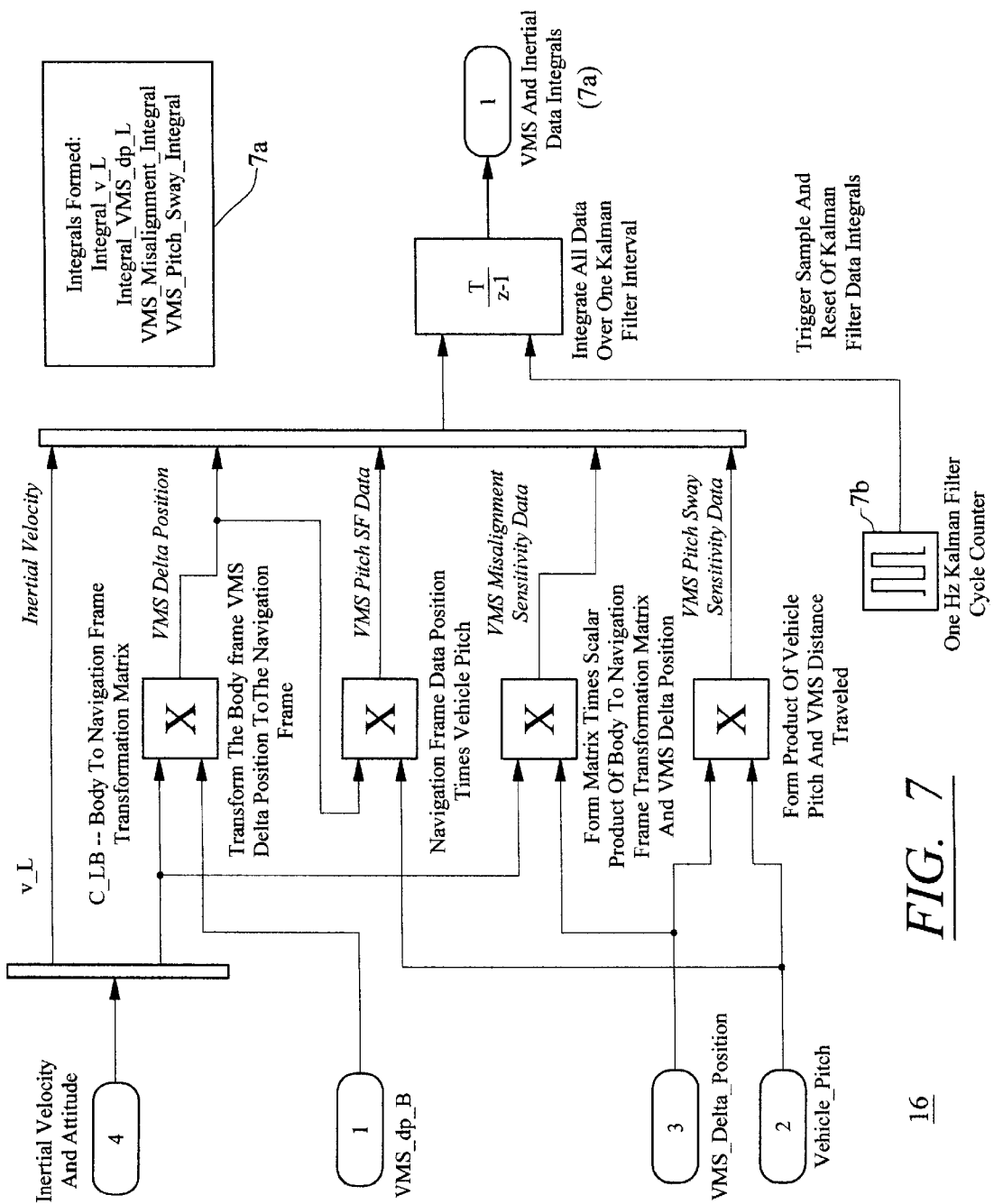
FIG. 7 shows the integration of velocity, position change, misalignments and sway.

FIG. 7 shows an integration means or process 16 that uses inertial and VMS data to form Kalman filter observations which combine the two different sources of position change information. In FIG. 7 the following signals are integrated:

1) Inertial velocity is directly integrated to result in integrated inertial velocity in the navigation frame (Integral_v_L).

2) VMS delta position in the navigation frame (Integral_VMS_dp_L) is the integration result of navigation frame transformation matrix C_LB combined with VMS_dp_B to transform the position change in the body frame to a navigation frame.

3) The product of the body to navigation frame transformation matrix (C_LB) and the VMS position change (VMS_Delta_Position) in the chassis creates the misalignment estimates. The integral is called VMS_Misalignment Integral.

4) The product of the vehicle pitch angle and the VMS position change is combined to determine sway. This integral is called VMS_Pitch_Sway_Integral.

As stated previously, all computations are performed at a higher computation rate than the computation rate of the Kalman filter, and this applies to the integrals as well. A typical rate for the Kalman filter would be one Hertz. The VMS integration might occur at any rate from 10 Hz to 100 Hz.

Figure 8:
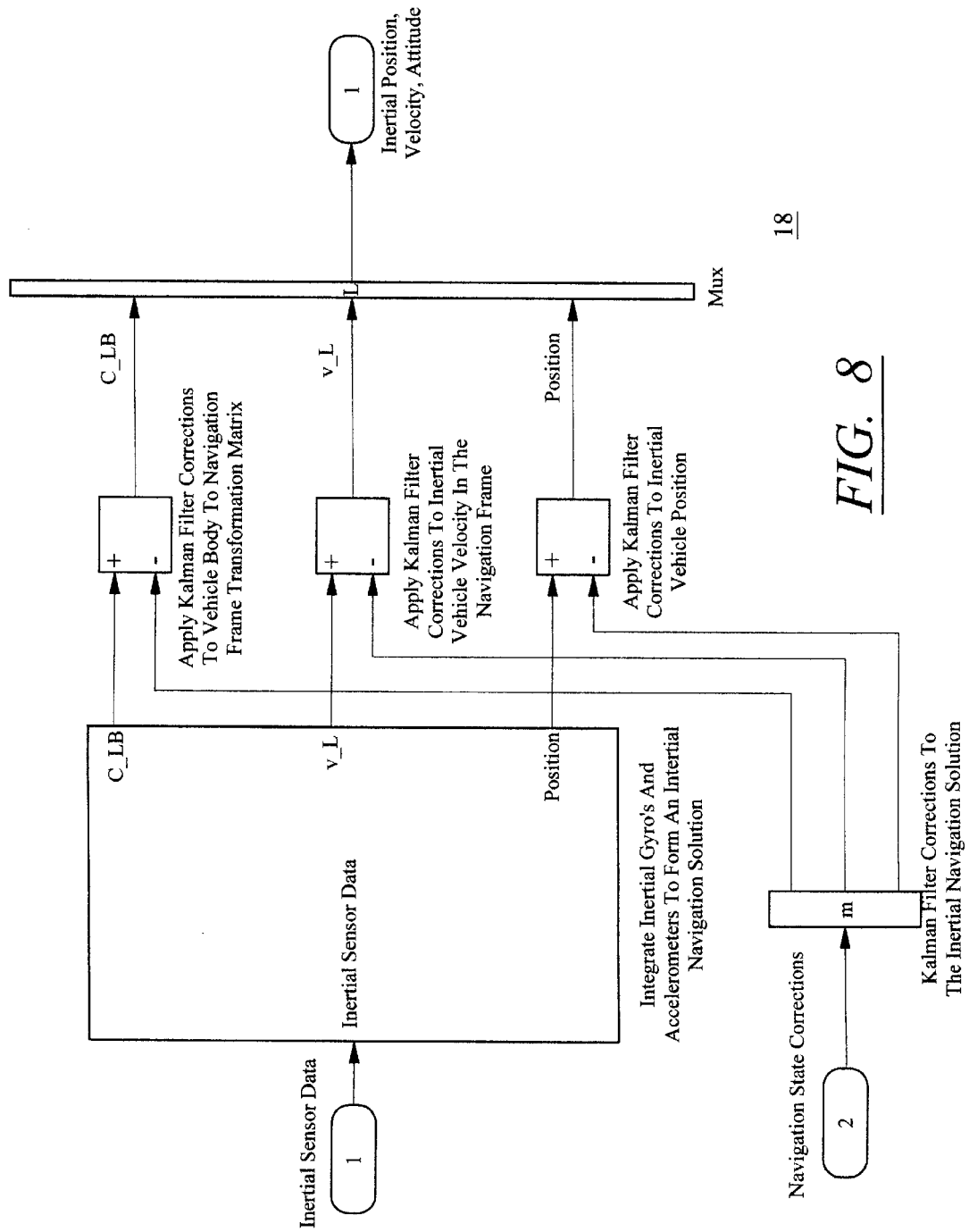
FIG. 8 shows correction of inertial navigation data.

FIG. 8 shows corrections means 18 that applies Kalman filter corrections to correct the inertial navigation solutions. These corrections are applied at the rate of the Kalman filter, typically one Hertz. A more complex model could include corrections for inertial sensor errors but that is not shown in this model. Firstly, the inertial sensor data from the gyro and the accelerometer are integrated to form an inertial navigation solution. This navigation solution is in the form of three outputs which are inertial vehicle velocity in the navigation frame, vehicle body to navigation frame transformation matrix, and inertial vehicle position. Kalman filter corrections are applied to these outputs to create a more accurate inertial position, velocity and attitude.

Figure 9:
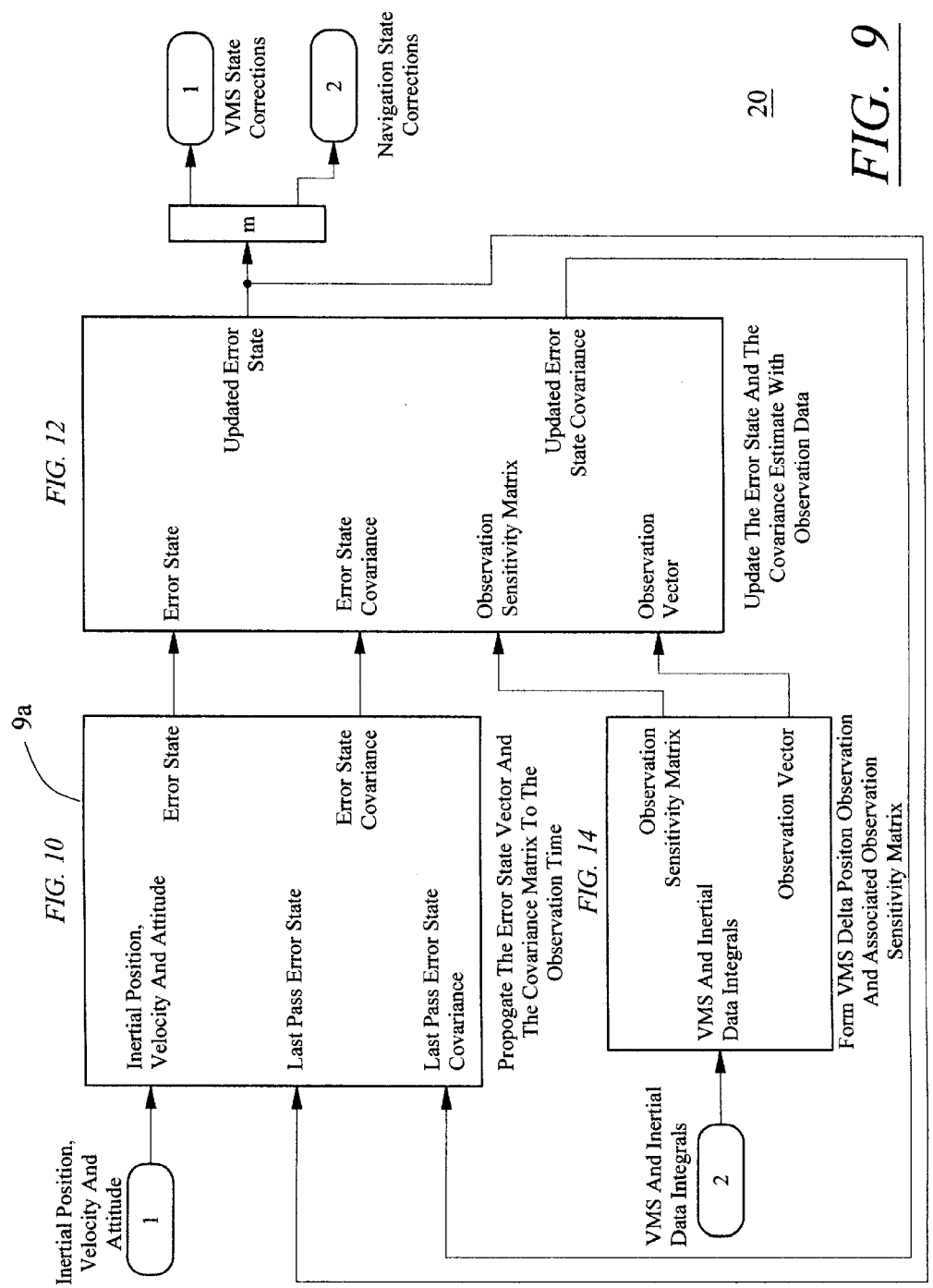
FIG. 9 shows the determination of corrections for the VMS as well as inertial navigation data.
Figure 10:
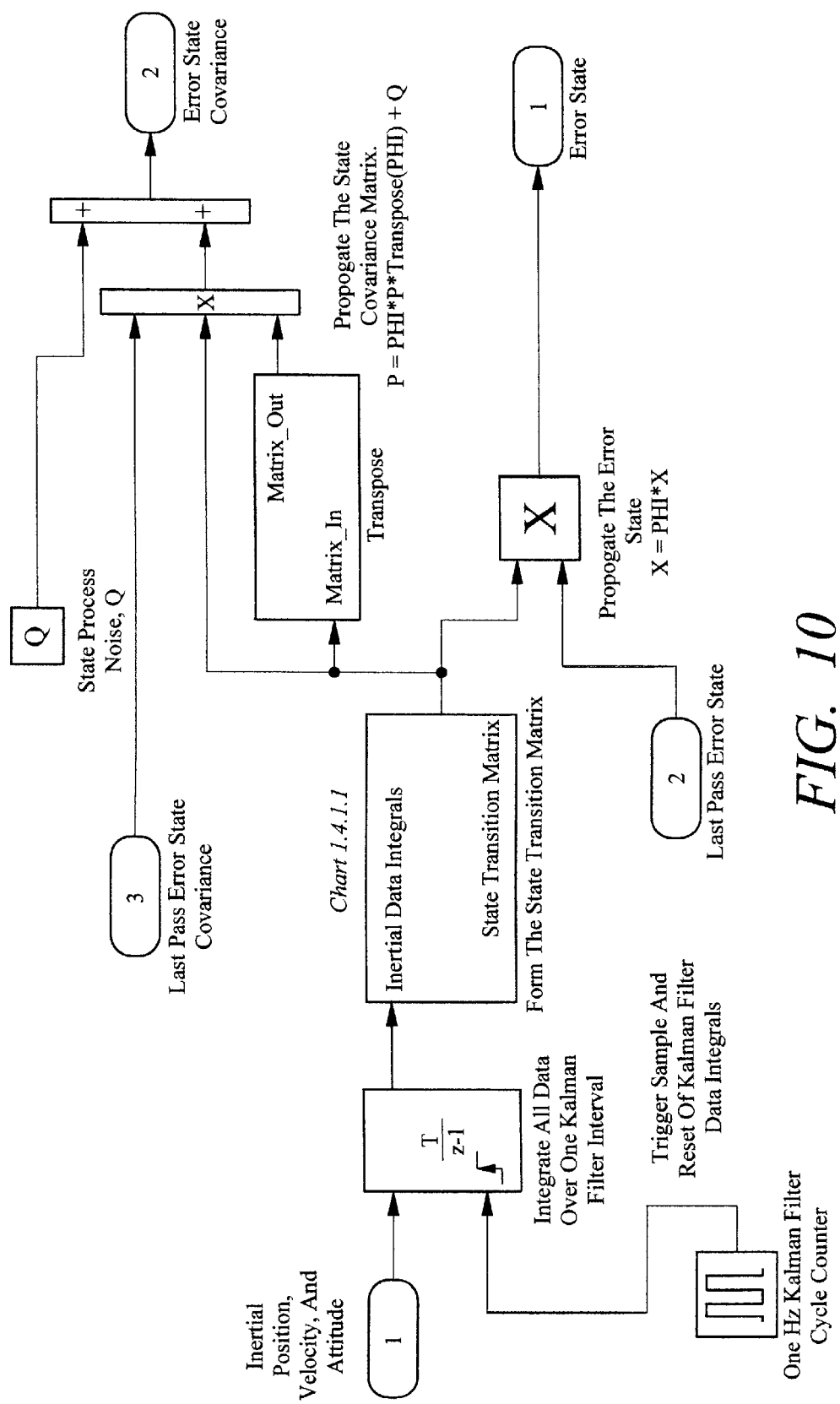
FIG. 10 shows the determination of errors and covariance matrix.
Figure 11:
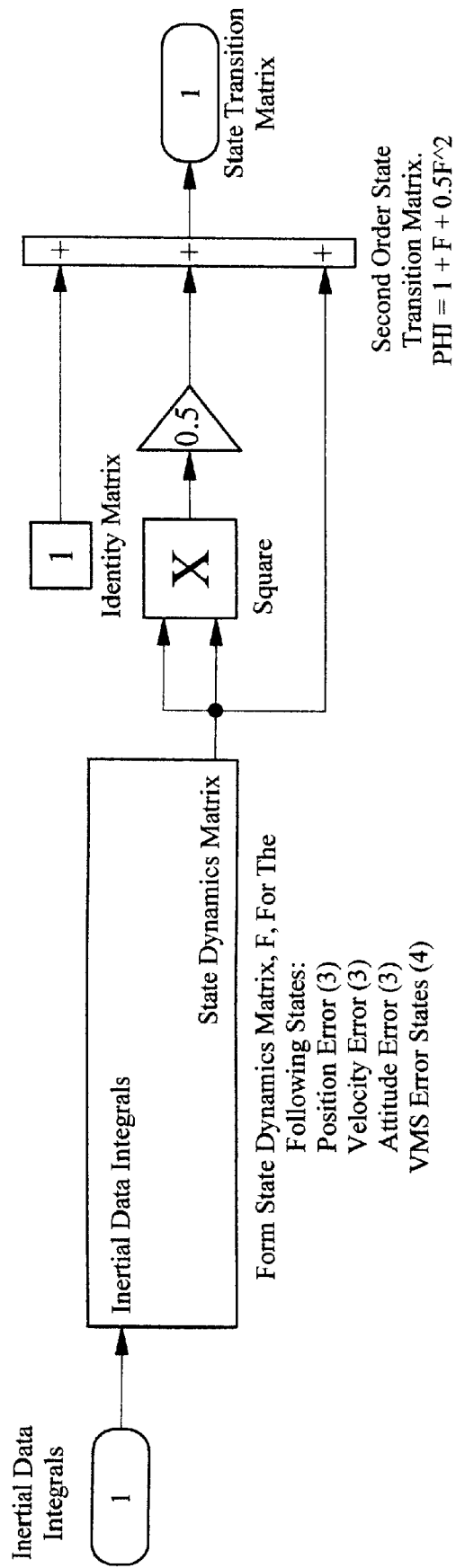
FIG. 11 shows the forming of the state transition matrix involved in determining the errors and covariance matrix.
Figure 12:
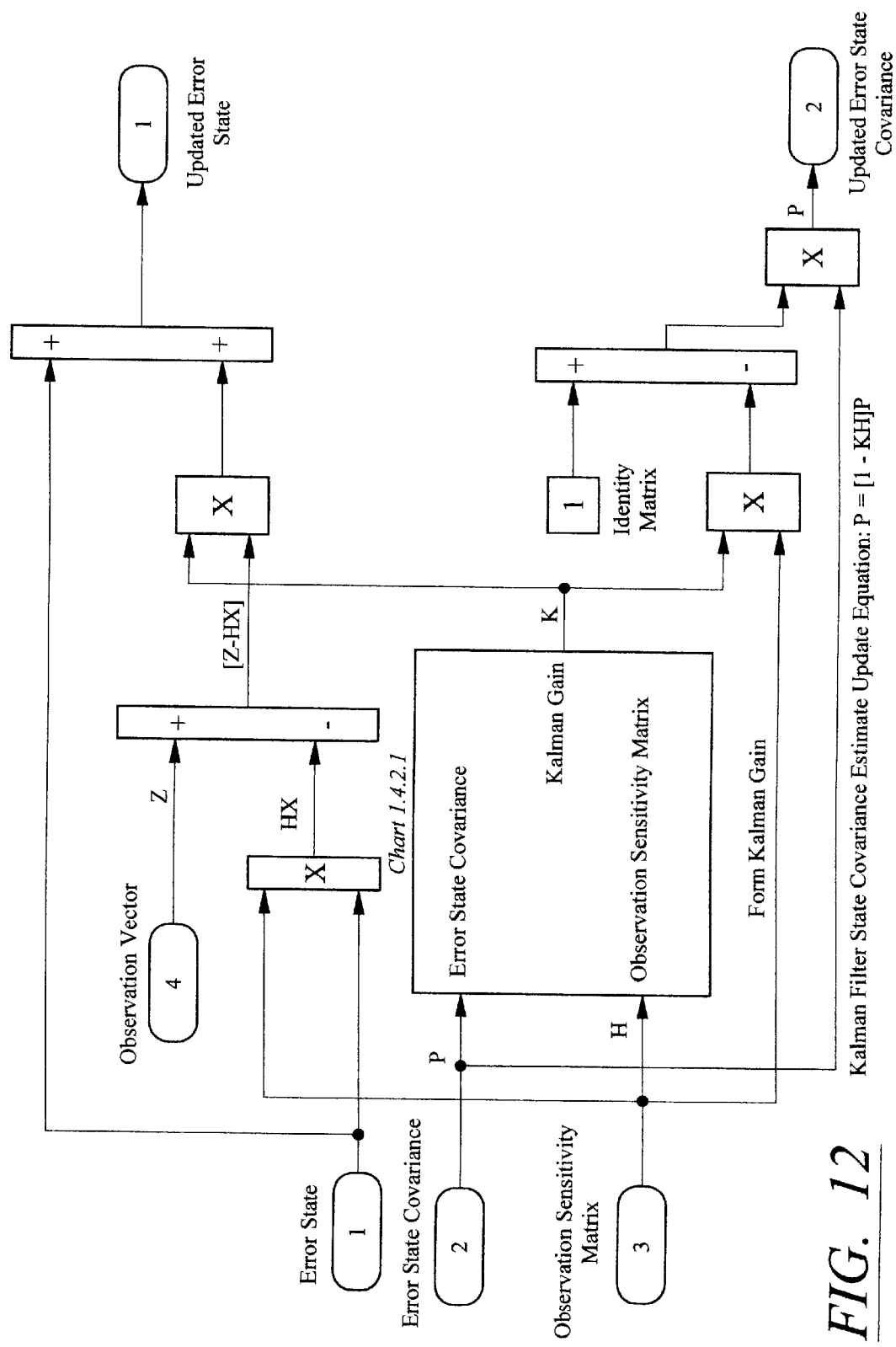
FIG. 12 shows the updating of the errors and covariance matrix.
Figure 13:
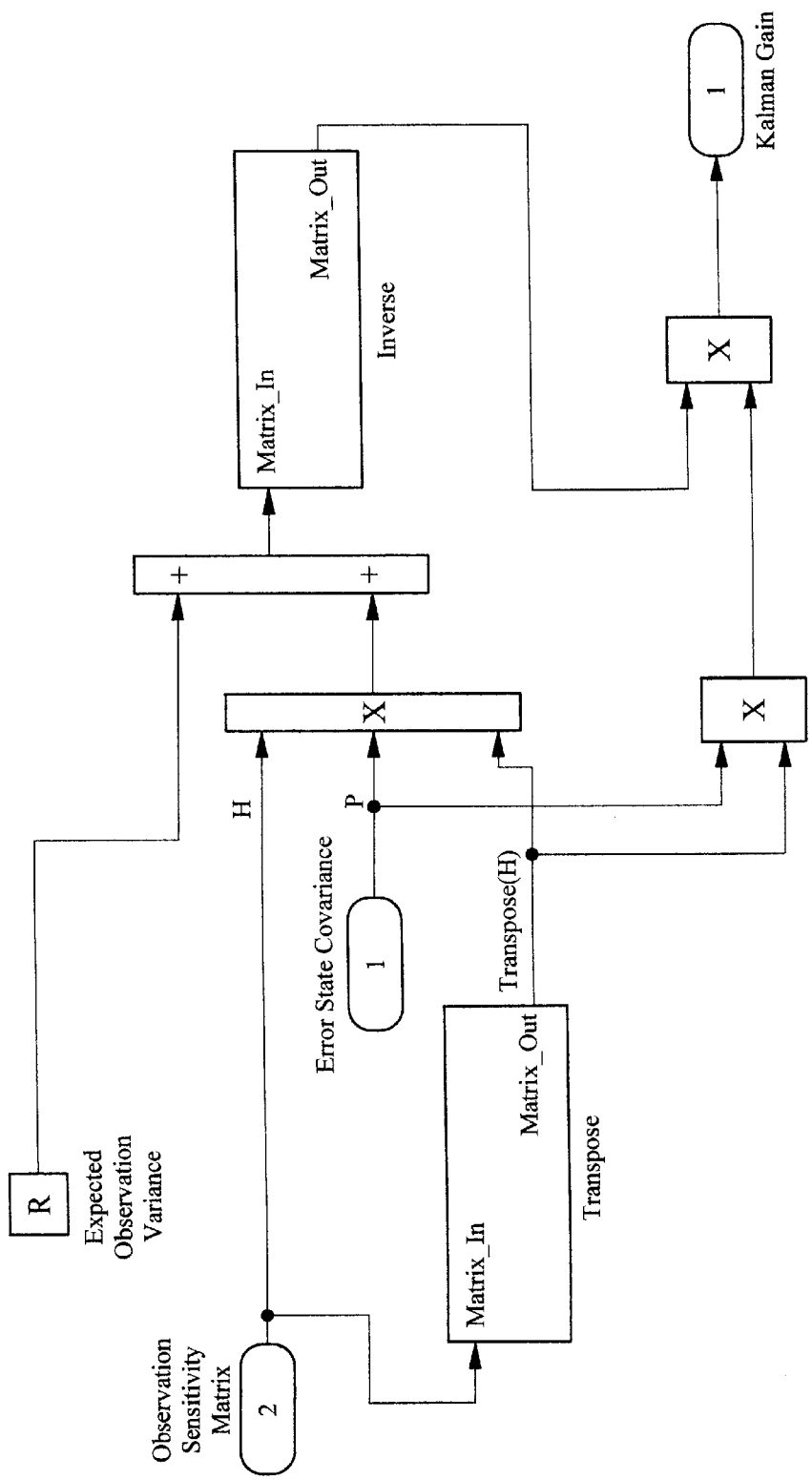
FIG. 13 shows the determination of the Kalman gain required in determining the updated errors as well as the updated covariance matrix.

FIG. 9 shows a means to develop corrections 20 for the VMS pulses as well as the inertial navigation data. The Kalman filter can be used to compare inertial and VMS data and determine errors in both sets of data. The inputs to this chart is the corrected inertial system data and the VMS and inertial data integrals. The outputs of this chart are the corrections to the inertial output and the VMS error states. FIG. 10 shows the equations used to update the covariance matrix and the error state estimate. FIG. 11 shows how the state transition matrix is formed using integrals of inertial information. FIG. 12 shows how the VMS delta position observation is used to update the estimate of inertial and VMS error states. FIG. 13 shows how the observation uncertainty data and the current estimate of the error state covariance are used to define the gain for the observations. The Kalman filter propagation and gain equations shown in these charts are based on the equations described in the book "Applied Optimal Estimation" written by the Technical Staff, the Analytic Sciences Corporation, edited by Arthur Gelb, 1974, as mentioned above. Other equations may be used to arrive at the results of the present invention such that the presented invention is not limited to these equations.

Figure 14:
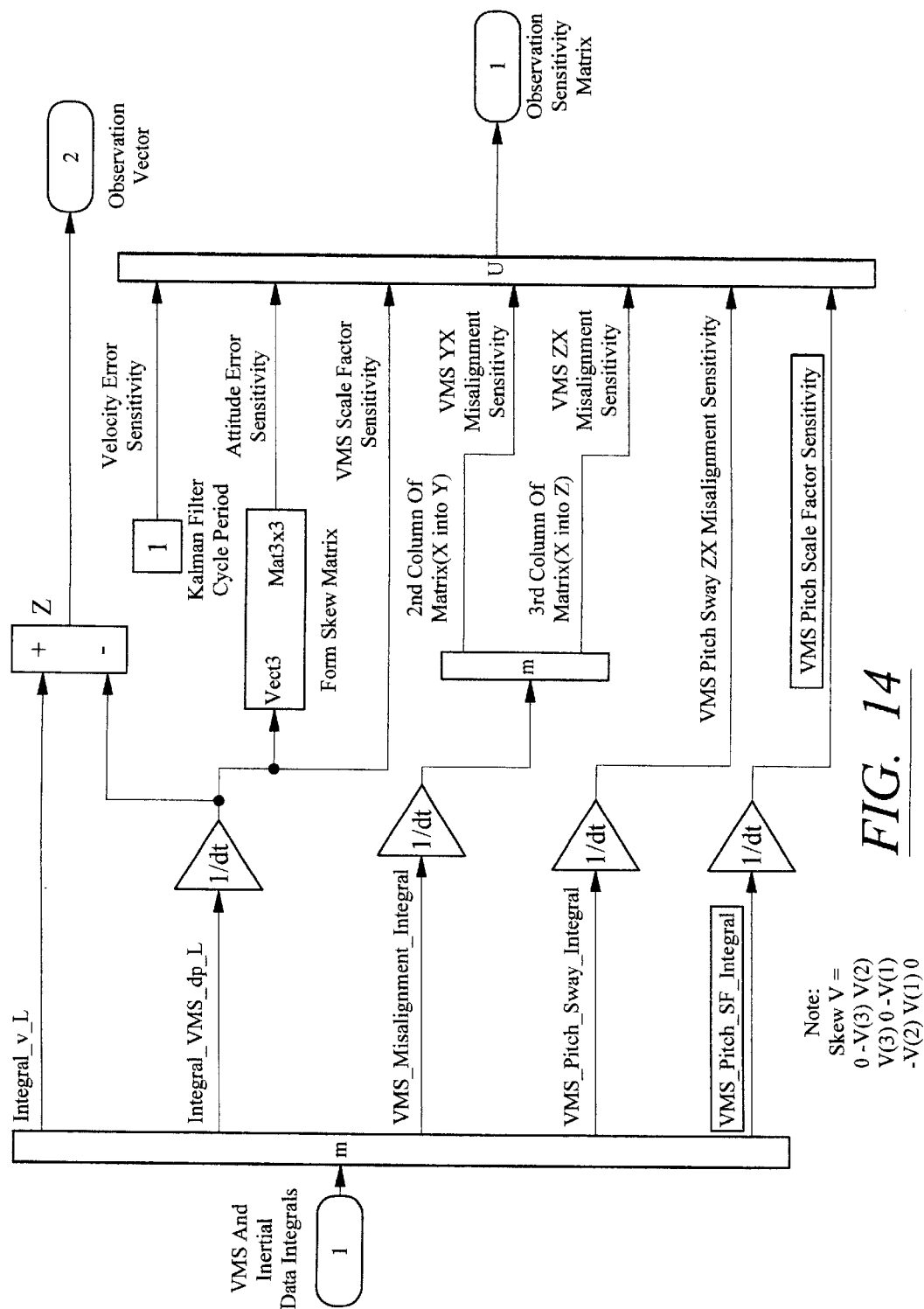
FIG. 14 shows partial determination of the correction factors for inertial navigation data as well as VMS based on integrated data that resulted from FIG. 7.

FIG. 14 shows the VMS delta position observation and the sensitivity of the observation to the VMS error states. Firstly, the integrals are scaled so that the data is no longer in relation to time. The Observation Vector is an updated position of distance traveled. The Observation Matrix has all the error sensitivities. Velocity and attitude are corrected based on known calculations. The VMS Misalignment Sensitivities are updating the misalignments in sway and between the axes. The VMS Scale Factor provides the scaling for determining the distance traveled. With the corrected misalignment outputs, the vehicle has the capability to obtain accurate determinations of inertial navigation data in a dynamic mobile environment.

VMS Error Correction

The discussion to the point explained a solution for INS errors arising from pitch and yaw affecting INS accuracy; that is, error from the relative movement between the body supporting the INS and the chassis supporting the VMS and using the VMS to correct them with the operation of the Kalman filter to account for the INS error/time growth. In other words, a correction to the inertial data on the assumption that the VMS is completely accurate.

Another aspect of the invention, however, considers inaccuracies in the VMS, which can arise because of changes on hills, weight distribution or traction. When this happens the INS and VMS disagree, but the error arises from the VMS.

In practice, both error correction processes are used with the Kalman filter determining how to apply each one.

The INS Kalman filter blends the new information from aiding devices with existing information from the INS internal sensors. The purpose of this blending of information is to estimate and remove the characteristic errors from the output of the INS as well as the error characteristics of the aiding devices. As an example of how those errors might arise in the VMS is explained by considering how the VMS pulses translate into speed and then velocity by integration.

The process to translate pulses into a distance traveled works as follows:

Allow 1 $Rev_{DS}$ to represent one revolution of the vehicle's drive shaft. The VMS will generate a number of pulses, represented by $K_1$, for each revolution of the vehicle's drive shaft. This is represented mathematically by the equation $$1\ Rev_{DS} = K_1\ Pulses \tag{1}$$

The manufacturer of the VMS determines the constant $K_1$. Similarly, in the case of a rear wheel drive vehicle, allow 1 $Rev_{RA}$ to represent one revolution of the vehicle's rear axle. A number of revolutions of the drive shaft, represented by $K_2$, will generate one revolution of the vehicle's rear axle. This is represented mathematically by the equation $$1\ Rev_{RA} = K_2\ REV_{DS} \tag{2}$$

The number $K_2$ is determined by the gear ratio in the differential. Finally, the distance the vehicle travels with each revolution of the rear axle is represented mathematically by the equation $$1\ Rev_{RA} = 2\pi R_L \tag{3}$$

Here the symbol $\pi$ is a mathematical constant that represents the ratio of the circumference of a circle to the circle's diameter. The symbol $R_L$ is the loaded radius of the tires attached to the rear axle. The loaded radius of a tire is the shortest distance that can be measured from the center of the tire to the ground. Each pulse is now represented by the equation $$1\ Pulse = \frac{2\pi R_L}{K_1 K_2} \tag{4}$$

The number of pulses (N) emitted by the VMS per unit time can now be multiplied by a scaling factor in order to determine the true distance traveled ($DT_{True}$) in that unit of time. The scaling factor is the product of two quantities. The first quantity, SF, is the nominal estimate of scale factor determined by the INS' manufacturer when the VMS is initially installed on the vehicle. The second quantity is $1+\Delta_{SF}$, where $\Delta_{SF}$ is the Kalman filter's dynamic estimation of the deviation of SF from nominal. This can be represented mathematically by the equation $$DT_{True} = SF*(1+\Delta_{SF})*N\ Pulses = SF*(1+\Delta_{SF})*N\frac{2\pi R_L}{K_1 K_2} \tag{5}$$

Figure 19:
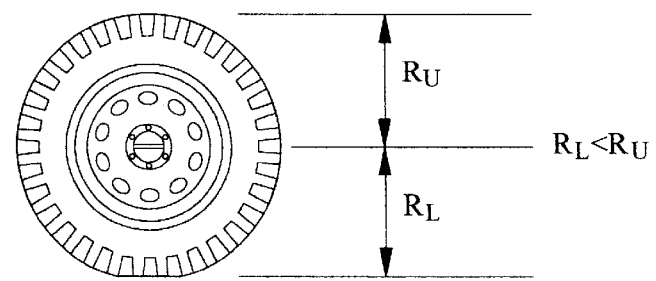

In order to use Equation (5), the INS' Kalman filter solves for the value $\Delta_{SF}$ that will most accurately translate the number of pulses received from the VMS to the true distance traveled by the vehicle. Unfortunately, the selection of the value for $\Delta_{SF}$ proceeds from the assumption that all other factors in Equation (5) remain constant over time. While 2, $\pi$, $K_1$, $K_2$ and SF are indeed constants, the loaded radius $R_L$ is not necessarily constant. In FIG. 19, the loaded radius $R_L$ is shown. As can be seen, the vehicle's tire is somewhat deformed from the shape of a true circle. This is due to the fact that the weight of the vehicle compresses the air in the tire, causing the loaded radius $R_L$ to be slightly less than the unloaded radius $R_U$ measured from the center of the tire to the top of the tire.

Figure 15:
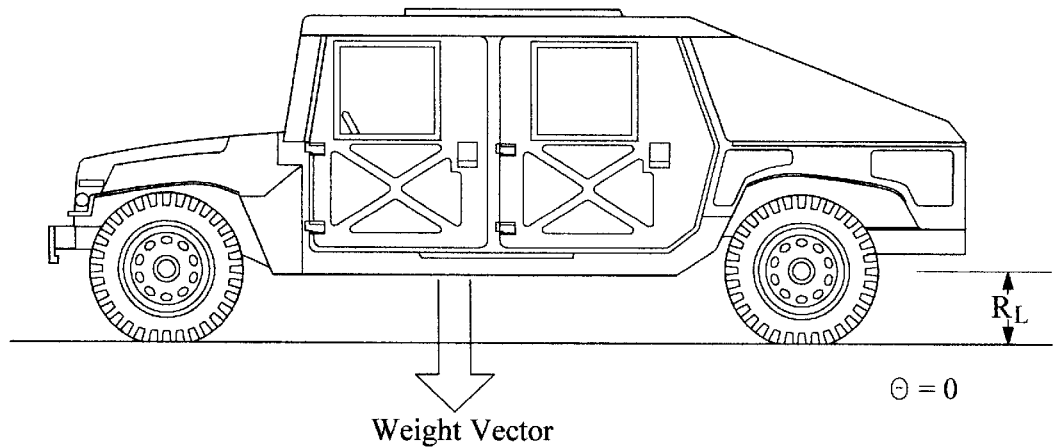
FIG. 15 shows a vehicle on tires in a level attitude.

The difference between $R_U$ and $R_L$ can, among other things, be attributed to the weight of the vehicle and the distribution of that weight between the front and rear tires. As such, the loaded radius for the rear tires may be different than the loaded radius for the front tires. In general, a vehicle's weight does not change while in motion, with the exception of the consumption of fuel, which is a small effect that occurs over an extended period of time. What can change rapidly while the vehicle is in motion is the weight distribution of the vehicle. The weight distribution of a vehicle traveling on level terrain is shown in FIG. 15. In this figure, the notation $\theta=0$ indicates that the surface the vehicle is traveling on makes an angle of zero degrees with the horizontal plane. As such, the weight vector of the vehicle is perpendicular to the vehicle's surface of travel. If a vehicle with an INS and a VMS aiding device began traveling on such a horizontal surface, the value of $\Delta_{SF}$ that the INS' Kalman filter would solve for is a function of the loaded radius shown in FIG. 15.

Figure 17:
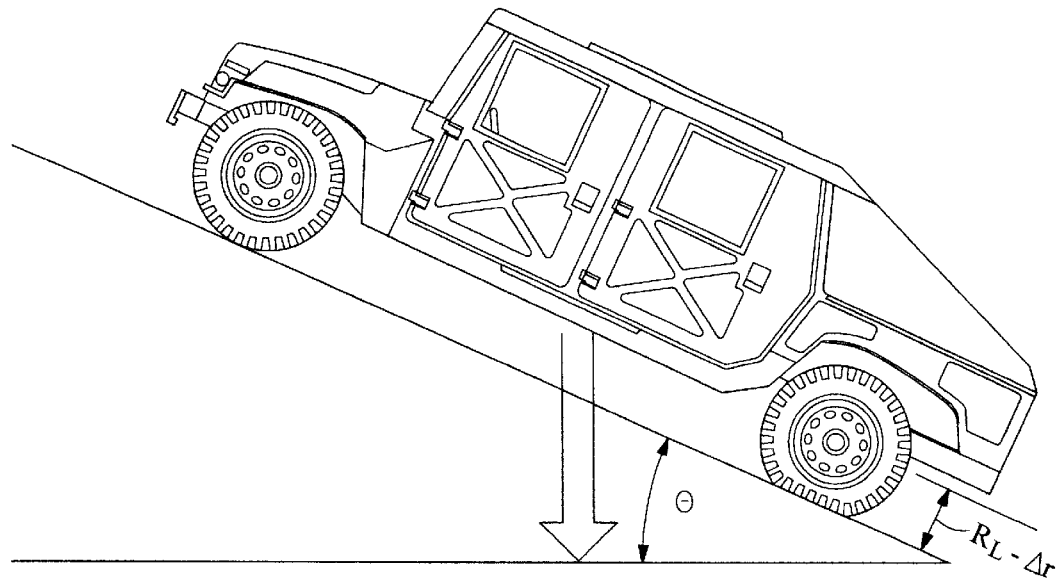
FIG. 17. Shows the vehicle on an incline.
Figure 18:
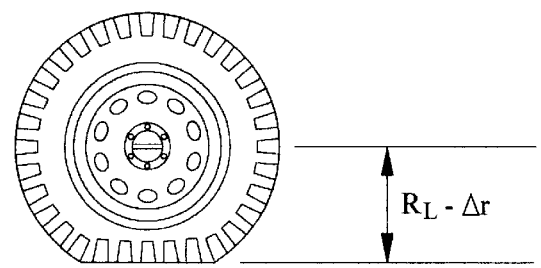
FIGS. 18 and 19 show the change in tire diameter due to changes the vehicles orientation.

Once the vehicle began traveling on a surface that was not parallel to the horizontal plane, the loaded radius of the vehicle would change to a new value. This is depicted in FIG. 17 below where a vehicle is shown traveling uphill. As can be seen from the figure, the weight distribution of the vehicle has changed from that depicted in FIG. 15. In FIG. 17, the weight distribution of the vehicle is shifted more towards the rear wheels and less towards the front wheels. As such, the air in the rear wheels is compressed under the greater weight and the loaded radius $R_L$ becomes shorter $R_L-\Delta r$ This effect is shown in greater detail in FIG. 18 below.

The amount $\Delta r$ is dependent, among other things, on the grade of the hill $\theta$ being ascended. The ramifications of the loaded radius changing value is that Equation (5), the equation for finding the true distance traveled by the vehicle, now becomes $$DT_{Reported} = SF*(1+\Delta_{SF})*N\frac{2\pi(R_L-\Delta r)}{K_1 K_2} \tag{6}$$

Which can be solved as $$DT_{Reported} = \tag{7}$$
$$SF*(1+\Delta_{SF})*N\frac{2\pi R_L}{K_1 K_2} - SF*(1+\Delta_{SF})*N\frac{2\pi\Delta r}{K_1 K_2}$$

Equation (7) shows that the error induced into the calculation of distance traveled is a linear error whose absolute value grows in direct proportion to $\Delta r$. Equation (7) can also be written as $$DT_{Reported} = DT_{True} - DT_{Error} \tag{8}$$

Figure 16:
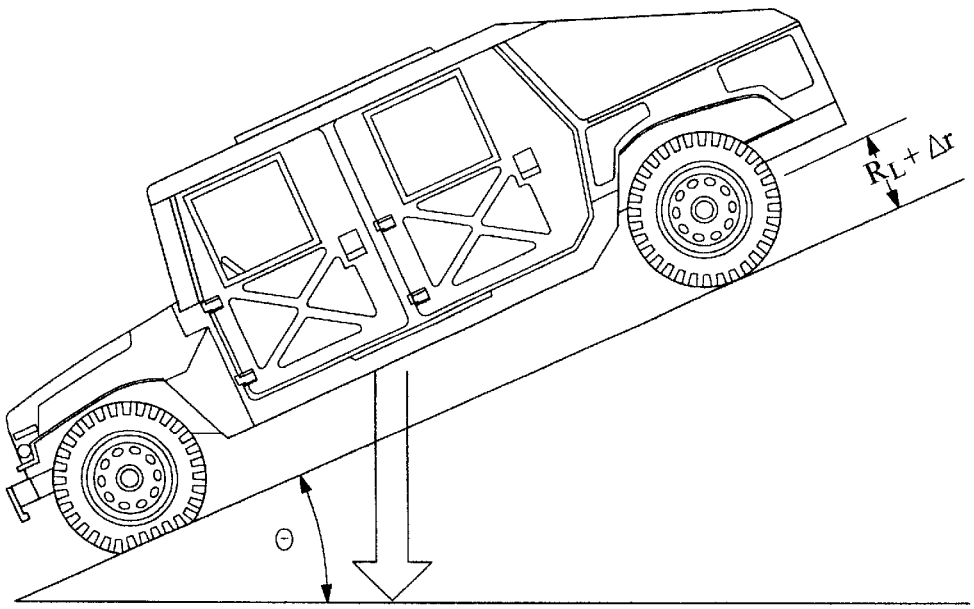
FIG. 16 shows the vehicle on decline.

The reverse of all of this is true in the case where the vehicle is traveling downhill. The weight distribution of the vehicle would shift towards the front tires and the loaded radius of the rear tires would increase by some amount $\Delta r$ as a function of the grade of the hill. This is illustrated below in FIG. 16. This will cause the error term in Equation (7) to change sign and become $$DT = SF*(1+\Delta_{SF})*N\frac{2\pi R_L}{K_1 K_2} + SF*(1+\Delta_{SF})*N\frac{2\pi\Delta r}{K_1 K_2} \quad (9)$$

The reverse of the entire previous discussion is true if the vehicle has a front wheel drive, which means the drive shaft does not drive the rear axle, but instead drives the front axle. In such a situation, the loaded radius of the front tires increases ascending a hill causing the error term in Equation (7) to have a positive sign. Also, the loaded radius of the front tires decreases while descending a hill causing the error term in Equation (9) to have a negative sign.

The error in the calculation of distance traveled is caused by the second term of Equation (7). This error term, shown below in Equation (10) grows linearly with $\Delta r$, and is a result of the loaded radius of a wheeled vehicle being incorrectly assumed by the mathematical model in the Kalman filter to be a constant, as depicted in Equation (5).

$$DT_{error} = -SF*(1+\Delta_{SF})*N\frac{2\pi\Delta r}{K_1 K_2} \quad (10)$$

This current state of the art VMS aided navigation system assumes a constant loaded wheel radius. The error caused by the second term of Equation (7) is determined by dividing Equation (10) by Equation (5). This yields Equation (11) that is a ratio of error to truth.

$$\frac{DT_{Error}}{DT_{True}} = \frac{-SF*(1+\Delta_{SF})*N\frac{2\pi\Delta r}{K_1 K_2}}{SF*(1+\Delta_{SF})*N\frac{2\pi R_L}{K_1 K_2}} = \frac{-\Delta r}{R_L} \quad (11)$$

Typical military applications require horizontal position errors on the order of 0.15% of distance traveled. Equation (11) implies that the tolerance for horizontal position errors of 0.15% of distance traveled can be exceeded on a vehicle with a loaded radius of 16 inches if the tires compress or expand an additional 0.024 inches while traveling over a hill.

The solution to this problem begins with the realization that the error in calculation of distance traveled, $DT_{error}$, is linear with respect to the dynamic change in loaded radius $\Delta r$, as shown in Equation (10). Next is the realization that within a bounded region $\Delta r$ is linear with respect to $\theta$, the angle the vehicle makes with the horizontal. Another way to say this is that, within a bounded region, $\Delta r$ is linear with respect to the grade of the hill the vehicle is traveling over. Yet another way of saying this is that, within a bounded region, $\Delta r$ is linear with respect to the pitch of the vehicle. An adequate range for this bounded region has been empirically determined to be plus or minus 10 degrees of pitch. As such, the solution involves the change of the mathematical model from that shown in Equation (5), to that shown below in Equation (12). In this equation $\theta$ is the pitch of the vehicle in radians, and $\alpha$ is a new parameter which represents the proportionality constant which, when multiplied by $\theta$, yields the estimated change in loaded radius $\Delta r$.

$$DT_{True} = SF*(1+\Delta_{SF})*N\frac{2\pi(R_L - \alpha\theta)}{K_1 K_2} \quad (12)$$

For purposes of Kalman filter implementation, Equation (12) is simplified as follows as shown in Equation (13).

$$DT_{True} = \text{Nominal\_VMS\_SF}*(1+\Delta_{SF}+K\_VMS\_SF\_\text{Pitch}*\theta)*N \quad (13)$$

where $$\text{Nominal\_VMS\_SF} = \frac{2 dR_L SF}{K_1 K_2} \quad (14)$$

and $$K\_VMS\_SF\_\text{Pitch} = -\frac{\alpha}{R_L} \quad (15)$$

The product of $\theta$ and $\Delta_{sf}$ considered small and is therefore ignored.

The solution to this error (VMS pitch error) is illustrated in the functional blocks in FIG. 4, showing the overall process including the INS error explained above, using the VMS pulses and Inertial Data as inputs.

Referring to FIG. 5, which describes how VMS, inertial, and Kalman filter data are used to form a vector representing vehicle position change in the vehicle body frame, the inputs are VMS pulses, VMS state corrections and inertial attitude. VMS pulses are the accumulated pulse sequence over a discrete time interval from the VMS; that is, representing a discrete rotation of the drive shaft. The VMS pulses are converted to distance traveled by multiplying by the nominal VMS scale factor K.

The VMS state corrections are corrections to the VMS error states, which are modeled by the Kalman filter. The Kalman filter models the time varying error in the VMS scale factor, the error in the VMS scale factor, which is proportional to vehicle pitch, the constant misalignment of the VMS relative to the INS, and the error in VMS misalignment, which is proportional to vehicle pitch. One of the state corrections is an estimated scale factor as a function of INS sensed pitch at process point 5a which multiplied 5b with vehicle pitch to produce the VMS SF Change as a function of pitch at process point 5c. The value at process point 5c is summed at 5d with a value KF_VMS_SF, also one of the VMS state Corrections, to produce the output VMS scale factor correction at process point 5e. The value at process point 5e is multiplied with the VMS distance, producing the corrected distance (VMS_Delta_Position) at process point 5g. The value obtained at point 5g is multiplied with a direction vector representing the nominal alignment between the body and chassis, produced at process point 5h.

The inertial attitude at 5j contains information about the vehicle pitch, which is used to form the current corrections to VMS misalignment and VMS scale factor.

The Kalman filter VMS scale factor error states are used to correct the VMS distance traveled. This corrected output is called VMS_Delta_Position (corrected distance traveled over the interval). The misalignment information is used to create a vector in the INS reference frame—the body frame, called VMS_dp_B (position change in the body reference frame).

The VMS delta position vector is formed at a computation above 10 Hz and below 100 Hz. FIG. 5 also demonstrates how the Kalman filter correction to scale factor as a function of pitch is applied.

In FIG. 7, which shows the formation of integrals VMS and inertial data, output sample integrals at each Kalman filter cycle describe the integration of inertial and VMS data used to form the Kalman filter observations, combining the two different sources of position change information. The following computations are performed in FIG. 7: Inertial velocity in the navigation frame, v_L, is integrated to form Integral_v_L. VMS delta position in the body frame is transformed to the navigation frame by multiplication with the body to navigation frame transformation matrix, C_LB.

This product is accumulated to form the integral of VMS delta position in the navigation frame, Integral_VMS_dp_L. Each element of the product of the body to navigation frame transformation matrix (C_LB) and the VMS delta position scalar is also integrated. This integral is called VMS_Misalignment_Integral. The product of the VMS delta position in the navigation frame and vehicle pitch angle is integrated to form the sensitivity to pitch related scale factor error. This integral is called VMS_Pitch_SF_Integral. The product of the vehicle pitch angle and the VMS position change is integrated to form the sensitivity to pitch related misalignment. This integral is called MS_Pitch_Sway_Integral.

All of the integrals are performed at a higher computation rate than the computation rate of the Kalman filter. The integrals are sampled and reset at each Kalman filter interval. A typical rate for the Kalman filter would be one Hertz. The VMS integration might occur at any rate from 10 Hz to 100 Hz.

FIG. 9, showing Kalman filter corrections to the inertial navigation solution and to the VMS error model, illustrates how a Kalman filter can be used to compare inertial and VMS data and determine errors in both sets of data. The inputs are the inertial system data and the VMS and inertial data integrals that were formed in FIG. 8. The first process performed involves propagating the error state vector and the error state covariance to the time of the VMS and inertial data sample performed in FIG. 8.

The VMS and inertial data integrals are used to form the VMS delta position observation, used by the Kalman filter. In addition, this data is used to form a sensitivity matrix for each observation. The sensitivity matrix mathematically relates how the observation effects each Kalman filter error state.

The Kalman filter then processes the observations creating an updated error state vector and an updated error covariance matrix. The updated error state vector is broken into two parts that are the outputs of this chart, corrections to the inertial error states and corrections to the VMS error states.

Referring to FIG. 14, VMS delta position observation and associated observation sensitivity matrix defines the VMS delta position observation and the sensitivity of the observation to the VMS error states. The integral of the VMS delta position in the navigation frame, Integral_VMS_dp_L, is scaled by the integration time and subtracted from the integral of the inertial velocity, Integral_v_L, to form the delta position observation. The sensitivity matrix for the delta position observations is formed. The sensitivity of this observation to velocity error is the time of the integration period. The sensitivity of this observation to attitude error is formed from the integral of the VMS delta position. The sensitivity of this observation to VMS scale factor error is also formed from the VMS delta position integral. The sensitivity of this observation to VMS misalignment error is formed from the VMS misalignment integral. The sensitivity of this observation to pitch related misalignment error is formed from the VMS pitch sway integral. The sensitivity of this observation to pitch related VMS scale factor error is formed from the VMS pitch scale factor integral. The outputs of this chart are the observation vector and the observation sensitivity matrix.

Kalman filter can be used to compare inertial and VMS data and determine errors in both sets of data. The inputs are the inertial system data and the VMS and inertial data integrals that were formed in FIG. 8. The first process performed involves propagating the error state vector and the error state covariance to the time of the VMS and inertial data sample performed in FIG. 8.

What is claimed is:

1. A system for accurately measuring inertial navigation data of a vehicle supported on inflated tires and having an upper body and a lower body, comprising:
   motion sensor means for determining changing orientation data of the upper body and the lower body from the rotation of said tires as the vehicle is moving;
   inertial sensor means for providing inertial sensor data for the vehicle; and
   means for producing said inertial navigation data from said inertial sensor data and orientation data comprising means for determining the pitch of the vehicle and determining vehicle pitch related errors in the orientation data from changes in tire diameter by comparison of the orientation data to the inertial sensor data and correcting the orientation data to reduce said errors.

2. The system of claim 1, wherein the means for determining the pitch comprises means for determining a pitch related error in said inertial sensor data using the difference between said changing orientation data from said motion sensor means and a calculated value for said changing orientation data computed from the inertial sensor data and correcting said inertial sensor data to reduce said pitch related error in said sensor data.

3. The system of claim 2 wherein the inertial navigation data is position, velocity and attitude.

4. The system of claim 1 wherein the orientation data is related to the speed of the lower body.

5. The system of claim 1 wherein the motion sensor means comprises an odometer.

6. The system of claim 1 wherein the inertial sensor means comprises gyros and accelerometers.

7. A system for determining accurate inertial navigation data of a vehicle having an upper body and a lower body, and supported on inflated tires, comprising:
   a motion sensor for determining orientation data for the upper body and the lower body as the vehicle in moving in response to the rotation of said tires;
   inertial sensors for providing inertial sensor data;
   apparatus for determining the inertial navigation data of the vehicle based on the inertial sensor data;
   apparatus for determining the difference in orientation between the upper body and the lower body;
   apparatus for integrating the inertial sensor data with the orientation difference to create integrated data; and
   apparatus for providing corrections to the inertial navigation data and the orientation data based on the integrated data for a more accurate inertial navigation data, said apparatus for providing corrections comprising means for determining a vehicle pitch related error in the orientation data produced by changes in tire diameter as a function of vehicle attitude manifested in the inertial data.

8. The system of claim 7 wherein the inertial sensor data is acceleration and angular motion.

9. The system of claim 7 wherein the orientation data is related to the speed of the lower body.

10. The system of claim 7 wherein the motion sensor is an odometer.

11. The system of claim 7 wherein the inertial sensors are gyros and accelerometers.

12. The system of claim 7 wherein the system, further comprises:
   means for determining position based on position change of the vehicle from a previously known position.

13. The system of claim 12 wherein the position change is integrated with the inertial sensor data and orientation difference to become part of the integrated data.

14. The system of claim 13 wherein the apparatus for providing corrections corrects position based on the integrated data.

15. The system of claim 7 wherein the orientation difference exists in the Z axis.

16. A method of providing accurate inertial navigation data in a wheeled vehicle having inflated tires, and an upper body and a lower body, comprising the steps of:

producing a speed signal that manifests the rotation of wheels on the vehicle;

producing a pitch signal manifesting the pitch of the vehicle;

producing a corrected speed signal as a function of said pitch signal to remove errors in the speed signal resulting from changes in the diameter of the tires;

integrating the corrected speed signal with inertial sensor data received from inertial sensors to create integrated data; and determining inertial navigation data for the vehicle from integrated data to provide accurate inertial navigation data.

17. The method of claim 16, further comprising:

determining orientation changes between the upper body and lower body;

correcting errors in the inertial data as a function of the relationship between the orientation changes and said speed signal to reduce an error between vehicle velocity determined from the speed signal and vehicle velocity determined from the inertial data.

18. A vehicle, comprising:

an inertial navigation system on a vehicle body suspended on a chassis;

an odometer providing a speed signal for inflated tires on the chassis;

means for determining vehicle pitch from the inertial navigation system, for determining an error in the odometer associated with changes in the diameters of the inflated tires from said pitch to produce a corrected speed signal for use in correcting errors in the inertial navigation system produced by movement between the body and the chassis.

* * * * *